United States Patent [19]

Hori

[11] Patent Number: 5,209,263
[45] Date of Patent: May 11, 1993

[54] PILOT VALVE ASSEMBLY
[75] Inventor: Shuji Hori, Kanagawa, Japan
[73] Assignee: Kabushiki Kaisha Komatsu Seisakusho, Tokyo, Japan
[21] Appl. No.: 768,329
[22] PCT Filed: Feb. 27, 1991
[86] PCT No.: PCT/JP91/00262
  § 371 Date: Oct. 17, 1991
  § 102(e) Date: Oct. 17, 1991
[87] PCT Pub. No.: WO91/13282
  PCT Pub. Date: Sep. 5, 1991
[30] Foreign Application Priority Data
  Feb. 27, 1990 [JP] Japan .................. 2-18212[U]
[51] Int. Cl.⁵ .............................................. F15B 13/06
[52] U.S. Cl. ........................ 137/636.2; 91/513; 91/522; 137/596.1
[58] Field of Search ............... 91/513, 522; 137/596.1, 137/636.2

[56] References Cited
U.S. PATENT DOCUMENTS
3,646,959  3/1972  Connett et al.
3,927,603  12/1975  Bernhoft .................. 91/513
4,184,512  1/1980  Pignolet .................. 137/596

FOREIGN PATENT DOCUMENTS
8508774  6/1985  Fed. Rep. of Germany.
2110368  6/1972  France.
49-37027  10/1974  Japan .................. 137/625.6

Primary Examiner—Gerald A. Michalsky
Attorney, Agent, or Firm—Frost & Jacobs

[57] ABSTRACT

A reliable pilot valve assembly having a control lever is produced at low cost while installed without requiring any additional switch and wiring and piping work. The assembly has a main valve body (1). A spool (27) is slidably mounted in the body (1) so as to be movable between a first and a second position. The spool (27) permits the pressure oil to circulate in a forward direction through a pair of the outlet ports and a pair of main outlet ports of the assembly when the spool (1) stays in the first position, and permits the pressure oil to circulate in a reverse direction (opposite to the forward one) through the pair of the outlet ports and the pair of the main outlet ports when the spool (1) stays in the second position, the main outlet ports being connected with a hydraulic circuit. The spool (1) is moved in operation between the first and the second position under the influence of a pressure exerted by the pressure oil confined in the other pair of the outlet ports, so as to permit the pressure oil to be reversed in flow direction in connection with a swaying direction of the control lever.

1 Claim, 7 Drawing Sheets

PILOT VALVE ASSEMBLY

FIELD OF THE INVENTION

The present invention relates to a pilot valve assembly including a manual control lever which is swayed in operation back/forth and rightward/leftward so as to select a desired one of oil passages formed in the assembly, through which one a pressure oil is supplied to a desired one of actuators used in a hydraulic circuit.

DESCRIPTION OF THE PRIOR ART

Figure 6:
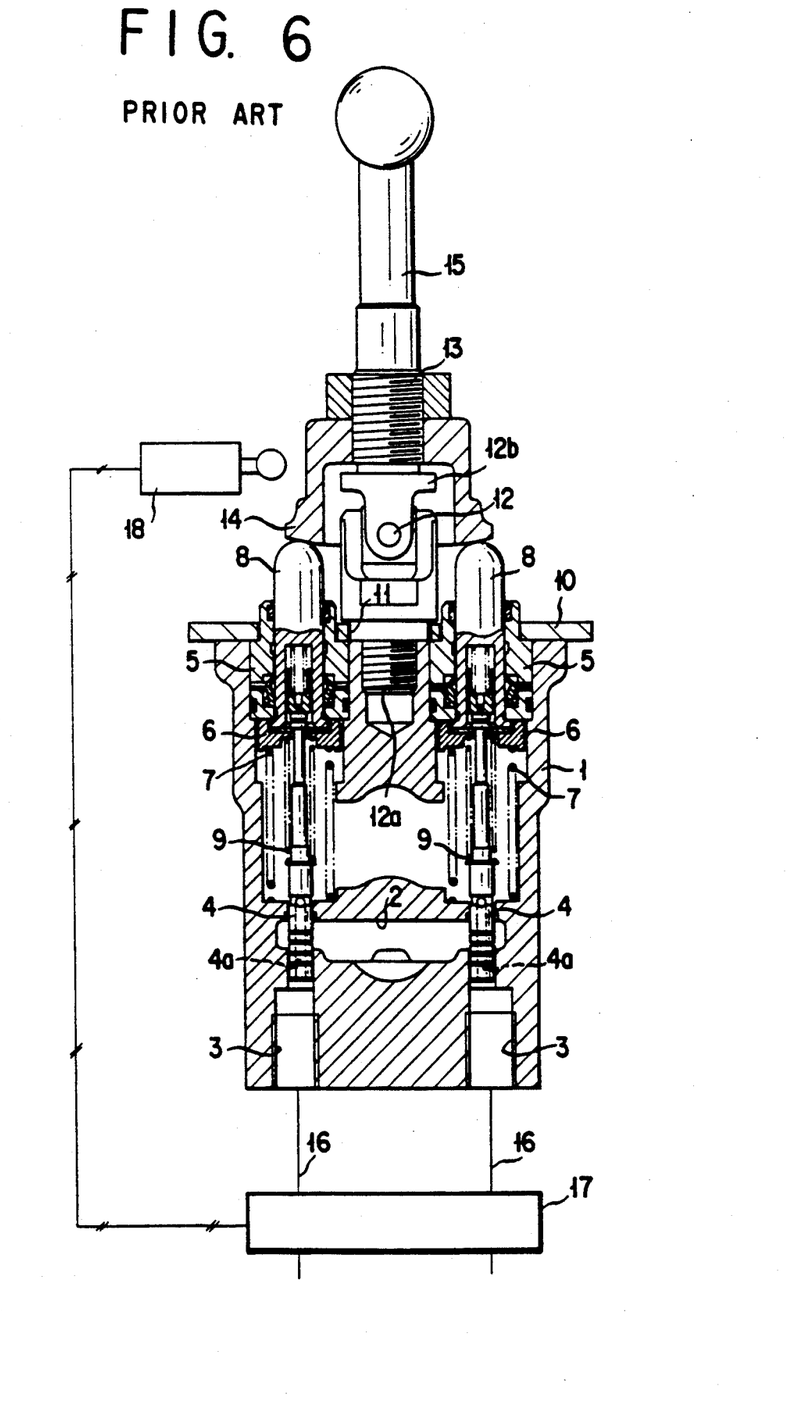
FIG. 6 is a longitudinal sectional view of the conventional pilot valve assembly.

Hitherto, it is known that, for example as shown in FIG. 6, in a conventional pilot valve assembly of this kind: each of four spool valves 4 is slidably mounted in a main valve body 1 of the assembly so as to permit and prevent communication of pressure oil from a pressure-oil port 2 to an outlet port 3 through an oil passage 4a formed in each of the spool valves 4; each of four guide sleeves 5 is mounted in the main valve body 1 so as to be coaxially arranged with each of the spool valves 4; each of four spring retainers 6 is movably mounted in the main valve body 1 so as to be disposed under each of the guide sleeves 5; each of four main compression springs 7 is so disposed under each of the spring retainers 6 as to axially urge the same 6 upward so that each of the spring retainers 6 is brought into a close contact with each of the guide sleeves 5, whereby each of four pistons 8 is urged upward under the influence of a resilient force exerted by each of the main compression springs 7, each of the pistons 8 being slidably mounted in each of the guide sleeves 5; each of four auxiliary compression springs 9 resiliently keeps each of the spool valves 4 in its shut-off position; a plate member 10 is fixedly mounted on an upper portion of the main valve body 1 so that the guide sleeves 5 are fixed to the main valve body 1, the plate member 10 being provided with a through-hole 11 through which a threaded base portion 12a of a universal joint member 12 is threadably connected with a threaded hole of the upper portion of the main valve body 1; and a swingable upper portion 12b of the universal joint member 12 is fixedly connected with a lower end of a threaded portion 13 of a manual control lever 15, which threaded portion 13 is threadably connected with a threaded hole of a disc member 14 so that the disc member 14 is coaxially arranged with the threaded portion 13 of the manual control lever 15. In operation of the conventional pilot valve assembly having the above construction, when an operator or user sways the manual control lever 15 of the assembly back/forth and rightward/leftward as required, the disc member 14 is also swayed so as to press a desired one of the pistons 8 downward, whereby a corresponding one of the spool valves 4 is displaced into its communication position in which the spool valve 4 permits the pressure oil (which is confined in the pressure-oil port 2) to be delivered to an outlet port 3 of the pilot valve assembly.

In general, the pilot valve assembly is used in a hydraulic circuit of a working vehicle such as power shovels and like construction machines provided with hydraulic actuators so as to control the actuators in operation. More particularly, in the hydraulic circuit: the pilot valve assembly has its pair of the outlet ports 3 connected with a pair of pilot-pressure chambers of a pilot-operated directional control valve; and, when the manual control lever 15 is swayed by the operator, the pressure oil is delivered to a desired one of the pilot-pressure chambers of the directional control valve to operate the same. As described above, in the conventional pilot valve assembly provided with the manual control lever 15, the operator selects a desired one of the pistons 8 by swaying the control lever 15 as required, so that a desired one of the outlet ports 3 of the pilot valve assembly (to which one the pressure oil should be delivered) is selected. In operation, for example, when the control lever 15 is swayed forward by the operator, the pressure oil is delivered from the pressure-oil port 2 to a corresponding one of the outlet ports 3. On the other hand, when the control lever 15 is swayed backward, the pressure oil is delivered to the other one of the outlet ports 3 from the pressure-oil port 2.

Figure 7:
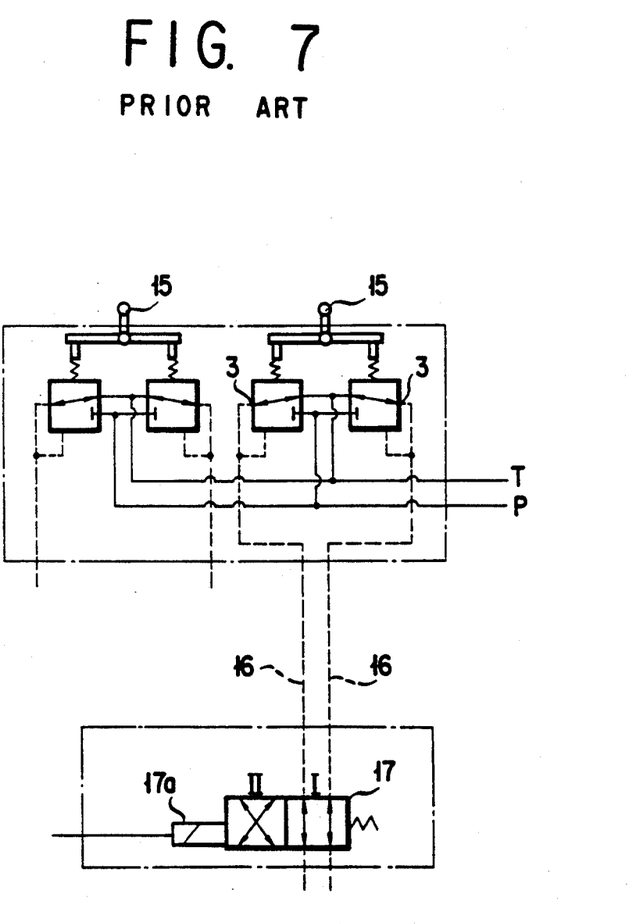
FIG. 7 is a block diagram of a hydraulic circuit of the conventional pilot valve assembly.

As described above, in the hydraulic circuit of the working vehicle provided with the conventional pilot valve assembly as shown in FIGS. 6 and 7, the directional control valve used in the hydraulic circuit is controlled by manually swaying the control lever 15.

On the other hand, in some of the working vehicles, it is often required to reversely operate a desired one of the hydraulic actuators by swaying the control lever 15 of the pilot valve assembly. In this case, it is necessary to reversely connect the pair of the outlet ports 3 of the pilot valve assembly to the pilot-pressure chamber of the pilot-operated directional control valve.

Consequently, in the conventional hydraulic circuit of the working vehicle and the like, hitherto, as shown in FIG. 6: the outlet ports 3 of the pilot valve assembly are connected with a solenoid-operated directional control valve 17 through a pair of fluid conduits 16; and a limit switch 18 (which is operated so as to be turned on or off by the control lever 15) is electrically connected with a solenoid of the directional control valve 17 so that the valve 17 is operated by the limit switch 18 when the control lever 15 is manually swayed by the operator, whereby the pressure oil delivered through the solenoid-operated directional control valve 17 to a desired one of the pilot-operated control valves of the hydraulic actuators is reversed in flow direction when the limit switch 18 is turned on or off.

More particularly, in operation of the conventional hydraulic circuit, as shown in FIG. 7, the solenoid-operated directional control valve 17 is held in its forward-flow position I when a solenoid 17a of the valve 17 is not energized. When the solenoid 17a is energized through the limit switch 18, the valve 17 is displaced toward its reverse-flow position II and held therein.

Consequently, it is possible for the conventional pilot valve assembly to reverse the flow of the pressure oil which is issued from the outlet port 3 of the assembly to the pilot-pressure chamber of the pilot-operated directional control valve. However, in installation of such conventional pilot valve assembly in the hydraulic circuit of the working vehicle and the like, it is necessary to further install auxiliary components such as the solenoid-operated directional control valve 17, limit switch 18, wires and pipes required in installation of the valve 17 and the switch 18 in the circuit. These auxiliary components increase manufacturing cost of the hydraulic circuit using the conventional pilot valve assembly, and decrease reliability of the circuit.

SUMMARY OF THE INVENTION

Under such circumstances, the present invention was made. Consequently, it is an object of the present invention to provide a pilot valve assembly which is reliable, can be produced at low cost and installed without installing any additional wiring and piping work.

According to one of aspects of the present invention, the above object of the present invention is accomplished by providing:

In a pilot valve assembly provided with a control lever which is swayed in operation back/forth and rightward/leftward so as to select a desired one of a plurality of pairs of outlet ports formed in a main valve body of the assembly, through which one a pressure oil is issued from the assembly, the improvement wherein:

a spool valve is slidably mounted in the main valve body of the assembly so as to be movable between a first position and a second position, in which the spool valve permits the pressure oil to circulate in a forward direction through a pair of the outlet ports and a pair of main outlet ports of the assembly when the spool valve stays in the first position, and permits the pressure oil to circulate in a reverse direction (opposite to the forward direction) through the pair of the outlet ports and the pair of the main outlet ports of the assembly when the spool valve stays in the second position, the main outlet ports of the assembly being connected with a hydraulic circuit; and the spool valve is moved in operation between the first position and the second position under the influence of a pressure exerted by the pressure oil confined in the other pair of the outlet ports.

The above object, additional objects, additional embodiments and advantages of the present invention will be clarified to those skilled in the art hereinbelow with reference to the following description and accompanying drawings illustrating preferred embodiments of the present invention according to principles of the present invention.

DESCRIPTION OF THE PREFERRED EMBODIMENTS

Hereinbelow, an embodiment and its modification of a pilot valve assembly of the present invention will be described in detail with reference to the accompanying drawings (FIGS. 1 to 5).

Figure 1:
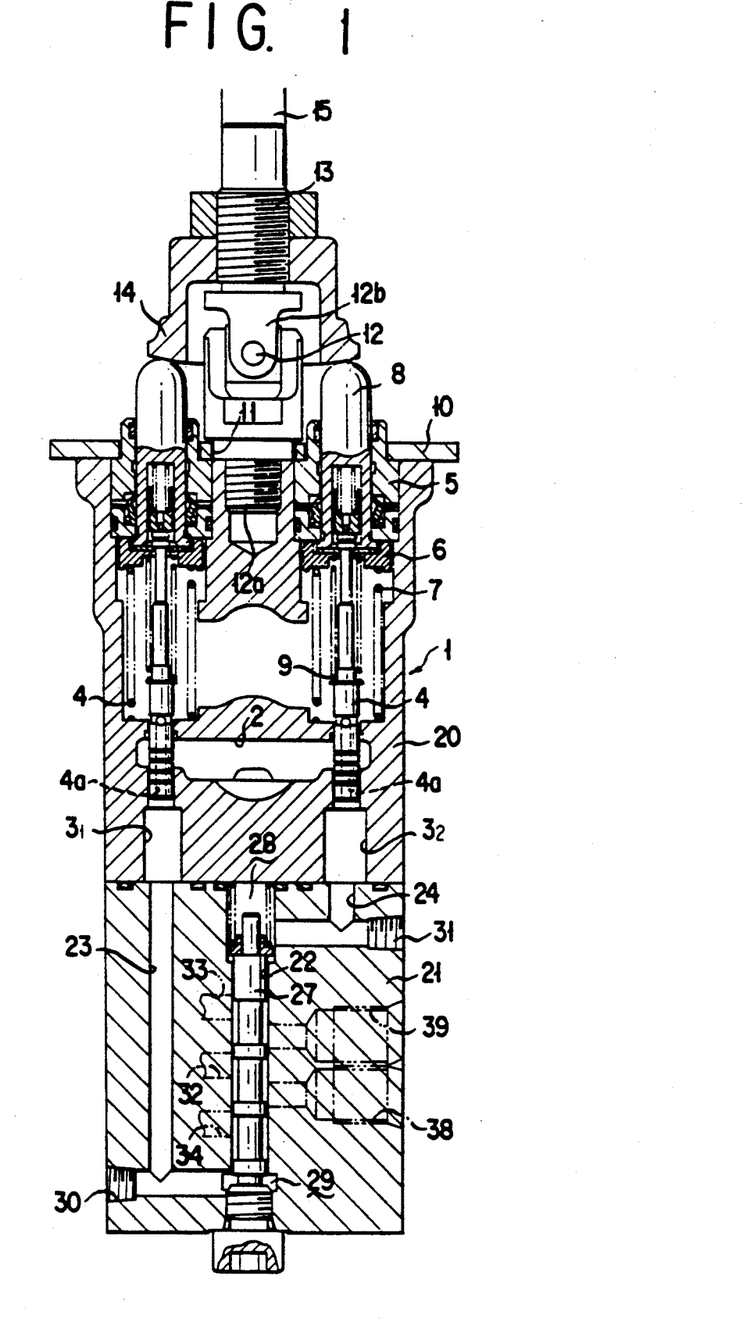
FIG. 1 is a longitudinal sectional view of an embodiment of the pilot valve assembly of the present invention, taken along a plane parallel to a back/forth swaying direction of the manual control lever of the assembly.
Figure 2:
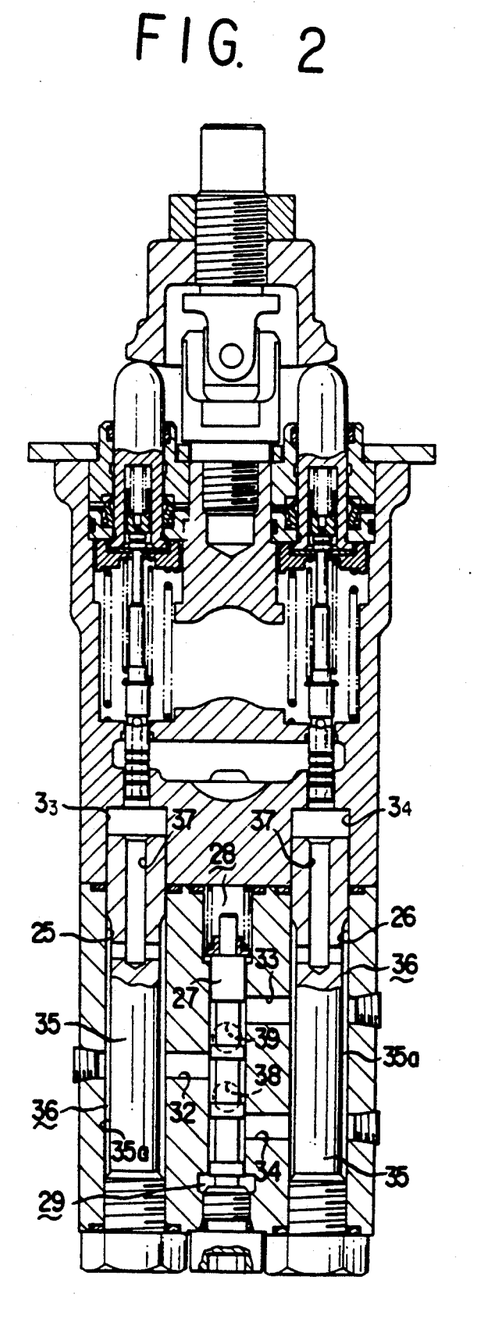
FIG. 2 is a longitudinal sectional view of the pilot valve assembly of the present invention, taken along a plane parallel to a rightward/leftward swaying direction of the manual control lever of the assembly.

FIG. 1 is a longitudinal sectional view of the embodiment of the pilot valve assembly of the present invention, taken along a first plane parallel to a back/forth swaying direction of a manual control lever 15 of the assembly. On the other hand, FIG. 2 is a longitudinal sectional view of the same embodiment, taken along a second plane perpendicular to the first plane of FIG. 1 (i.e., taken along a rightward/leftward swaying direction of the manual control lever 15 of the assembly). In the following description, like reference numerals apply to similar parts throughout the drawings including FIGS. 6 and 7. As shown in FIG. 1 taken along the first plane, the pilot valve assembly of the present invention is provided with a main valve body 1 in which are formed four outlet ports comprising a first outlet port $3_1$ and a second outlet port $3_2$. On the other hand, as shown in FIG. 2 taken along the second plane, the remaining outlet ports formed in the main valve body 1 of the assembly are a third outlet port $3_3$ and a fourth outlet port $3_4$.

As shown in FIG. 1, the main valve body 1 of the pilot valve assembly is constructed of: a pilot valve body 20 provided with four outlet ports 3, in which body 20 are slidably mounted four spool valves 4; and a directional control valve body 21 in which are formed a spool bore 22, a first bore 23, a second bore 24, a third bore 25 and a fourth bore 26. A main spool valve 27 is slidably mounted in the spool bore 22 of the directional control valve body 21 so that a first pilot-pressure chamber 28 and a second pilot-pressure chamber 29 are defined in the pilot valve assembly in which: the first bore 23 opens into the first outlet port $3_1$, the second pilot-pressure chamber 29 and a first main outlet port 30 formed in the directional control valve body 21; the second bore 24 opens into the first pilot-pressure chamber 28 and a second main outlet port 31 formed in the directional control valve body 21; the third bore 25 opens into the third outlet port $3_3$ and the a first inlet port 32 formed in the directional control valve body 21; and the fourth bore 26 opens into the fourth outlet port $3_4$, a second inlet port 33 and a third inlet port 34, which inlet ports 33, 34 are formed in the directional control valve body 21. Incidentally, in the embodiment of the present invention shown in FIGS. 1 and 2, a rod member 35 is mounted in each of the third bore 25 and the fourth bore 26 while provided with a small-diameter intermediate portion 35a and an oil passage 37. As is clear from FIG. 2, a fluid passage 36 is defined between the rod member 35 and each of the third bore 25 and the fourth bore 26. Consequently, the fluid passage 36 communicates with each of the third outlet port $3_3$ and the fourth outlet port $3_4$ through each of the oil passages 37 of the rod members 35, and also communicates with each of the first inlet port 32, second inlet port 33 and the third inlet port 34.

The main spool valve 27 is slidably moved in operation between a first position and a second position in the spool bore 22 of the directional control valve body 21 to permit each of the first inlet port 32, second inlet port 33 and the third inlet port 34 to selectively communicate with each of the third main outlet port 38 and the fourth main outlet port 39, and forms an essential part of the pilot-operated directional control valve in cooperation with the directional control valve body 21.

Figure 3:
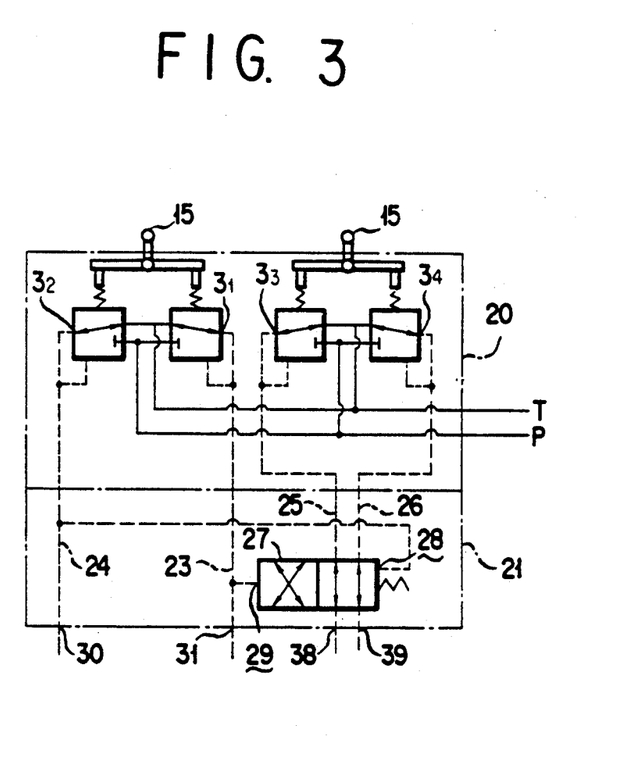
FIG. 3 is a block diagram of a hydraulic circuit of the pilot valve assembly of the present invention shown in FIGS. 1 and 2.

A hydraulic circuit of the pilot valve assembly of the present invention having the above construction is shown in FIG. 3.

Now, operation of the assembly of the present invention will be described in detail hereinbelow.

When the operator holds the manual control lever 15 of the pilot valve assembly in its neutral position, pressure oil confined in a pressure-oil port 2 (which is formed in a main valve body 20) is not delivered to any of the outlet ports $3_1$, $3_2$, $3_3$ and $3_4$ of the assembly, so that the main spool valve 27 is held in the first position (shown in FIGS. 1 and 2) to permit: the first inlet port 32 to communicate with the third main outlet port 38; and the second inlet port 33 to communicate with the fourth main outlet port 39, whereby the pressure oil is permitted to circulate in a forward direction through the assembly.

Under such circumstances, when the operator sways the control lever 15 rightward and leftward as required so as to permit the pressure oil confined in the pressure-oil port 2 to flow into the third outlet port $3_3$ or into the fourth outlet port $3_4$ through the oil passage $4a$ (which is formed in each of the spool valves 4), the pressure oil is supplied from the third outlet port 38 or the fourth outlet port 39 of the assembly to a desired one of actuators of the working vehicle and the like. Consequently, in this condition, as is clear from FIGS. 1 to 3, a swaying direction in which the control lever 17 is swayed is coincident with a issuance direction in which the pressure oil is issued.

Further, in the above condition, when the control lever 15 is swayed rightward or leftward in a condition in which the lever 15 is already swayed forth to permit the first outlet port $3_1$ to receive the pressure oil from the pressure-oil port 2, the thus received pressure oil flows from the first outlet port $3_1$ into the second pilot-pressure chamber 29 through the first bore 23 to move the main spool valve 27 to the second position in which the main spool valve 27 permits the first inlet port 32 to communicate with the fourth main outlet port 39 and also permits the third inlet port 34 to communicate with the third main outlet port 38 so that the pressure oil is permitted to circulate in the reverse direction (opposite to the above forward direction) through the assembly, whereby the pressure oil flows from the third outlet port $3_3$ into the fourth main outlet port 39, and also flows from the fourth outlet port $3_4$ into the third main outlet port 38. As a result, in the above case, the issuance direction of the pressure oil in the assembly is opposite to the swaying direction of the control lever 15.

Figure 4:
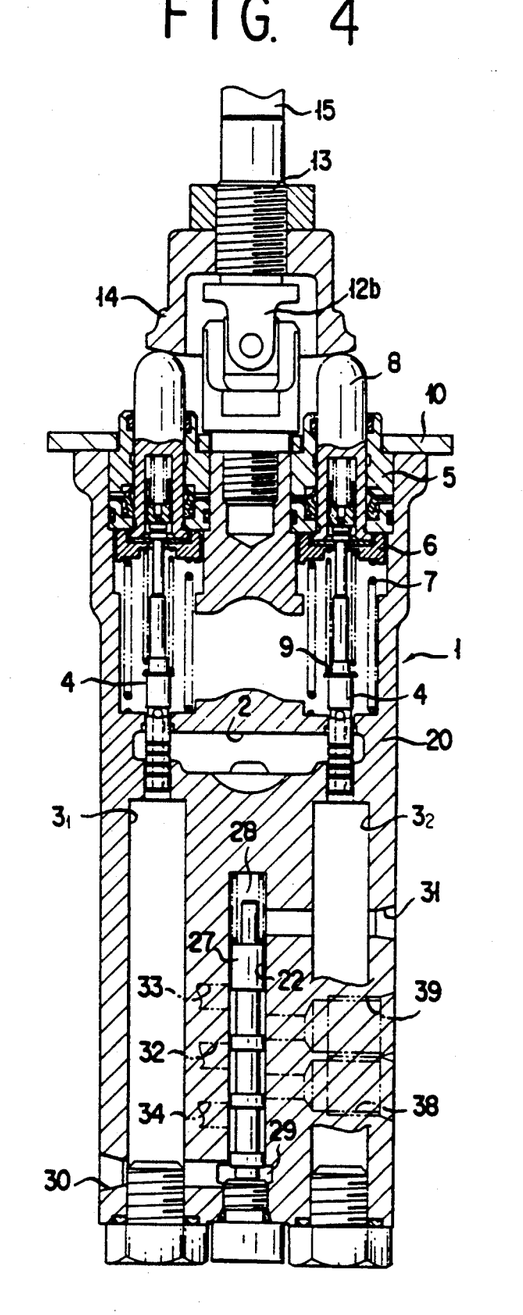
FIG. 4 is a longitudinal sectional view of a modification of the embodiment of the present invention shown in FIGS. 1 and 2, taken along a plane parallel to a back/forth swaying direction of the manual control lever of the modification of the embodiment.
Figure 5:
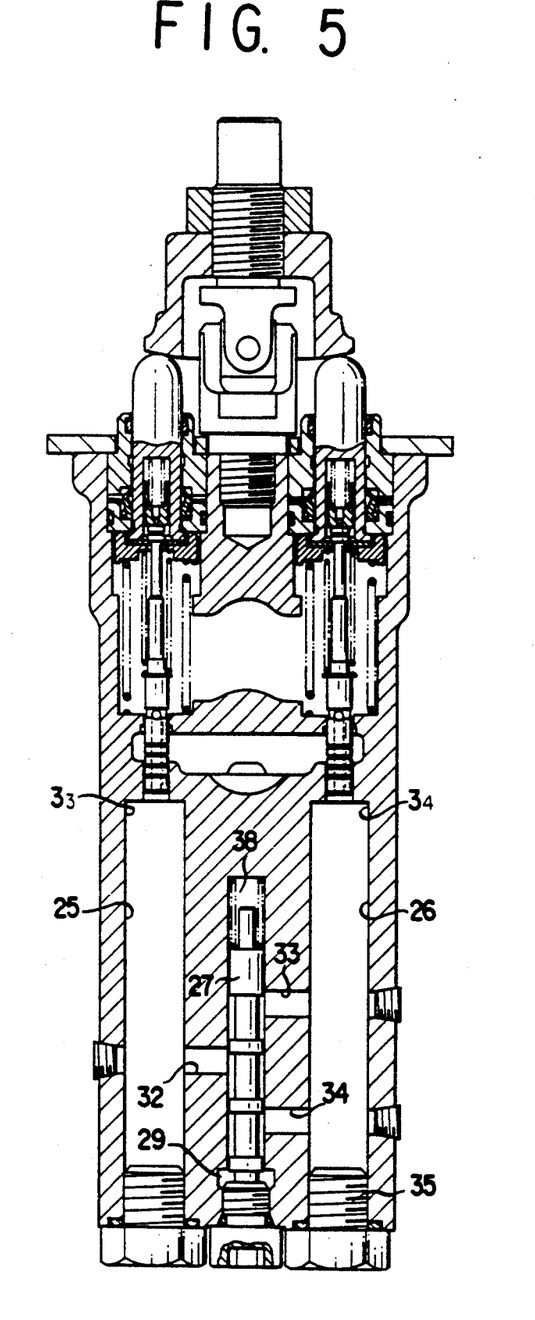
FIG. 5 is a longitudinal sectional view of the modification of the embodiment of the present invention shown in FIGS. 1 and 2, taken along a plane parallel to a rightward/leftward swaying direction of the manual control lever of the modification of the embodiment.

FIGS. 4 and 5 show a modification of the above embodiment of the pilot valve assembly of the present invention. In the modification, the directional control valve body 21 shown in FIG. 1 is integrally formed with the main valve body 20 to from a main valve body 1 as shown in FIG. 4. Consequently, the spool valves 4 and the pistons 8 are slidably mounted in an upper portion of the thus integrated main valve body 1 in a lower portion of which the main spool valve 27 is slidably mounted.

As described above in detail, in the pilot valve assembly according to the present invention, since the main spool valve 27 is provided in the main valve body 1, any additional wiring and piping work is not required in installation of the pilot valve assembly of the present invention in the hydraulic system of the working vehicle and the like. Further, the conventional limit switch is not required too in the above installation, since the main spool valve 27 of the assembly is moved between the first position and the second position as required under the influence of the pilot pressure acting on the axial end of the spool valve 27. Therefore, it is possible to manufacture the pilot valve assembly of the present invention at low cost, the assembly being improved in reliability.

I claim:

1. In a pilot valve assembly provided with four pistons arranged in parallel relationship with one another and spaced apart from one another at an equal distance so as to be in first and second pairs of respective two pistons opposite to each other, each piston being inserted into a main valve body slidably in its longitudinal direction parallel to the axis of said valve body and being urged upwardly by means of a compression spring interposed between a proximal end thereof and said main valve body so as to project its leading end outwardly of the valve body; a disc member whose lower surface comes into contact with respective leading ends of said pistons; a control lever connected to an upper central portion of said disc member, said lever being swayed in operation in such a back and forth direction, so as to cause to thrust through said disc member either one of said first pair of pistons and in such a direction transverse to said back and forth direction, so as to cause to thrust through said disc member either one of said second pair of pistons; a pressure-oil port formed within said main valve body at an approximately intermediate portion with respect to the axial direction of said valve body; four outlet ports formed within said main valve body in parallel relationship with one another and spaced apart from one another at an equal distance so as to be in first and second pairs of respective two outlet ports opposite to each other, each of said outlet ports extending downward in a substantially linear relationship with each of said pistons; and four spool valves provided in said main valve body and operatively connected to said four pistons, respectively, so as to selectively allow at least any one of said outlet ports to communicate with said pressure-oil port and, on the other hand, other outlet ports to interrupt the communication with said pressure-oil port;

the improvement comprising:

(a) a pair of first and second main outlet ports formed in said main valve body so as to selectively establish and block communication of said main outlet ports to communicate/discommunicate with said pairs of outlet ports, respectively; and (b) a spool valve slidably mounted in said main valve body of the pilot valve assembly so as to be movable between a first position, where one of said second pair of outlet ports and the other outlet port thereof are allowed to communicate with said first main outlet port and said second main outlet port, respectively, and a second position, where one of said second pair of outlet ports and the other outlet port thereof are allowed to communicate reversely with said second main outlet port and said first main outlet port, respectively; wherein said spool valve is moved in operation to said first position by the action of pressure oil introduced through one of said first pair of outlet ports from said pressure-oil port to one longitudinal end of said spool valve and, on the other hand, said spool valve is moved in operation to said second position by the action of pressure oil introduced through the other outlet port of said first pair of outlet ports from said pressure-oil port to the other longitudinal end of said spool valve.

* * * * *